United States Patent
Takeichi et al.

(10) Patent No.: US 8,362,890 B2
(45) Date of Patent: Jan. 29, 2013

(54) OBJECT DETECTING APPARATUS

(75) Inventors: Masakazu Takeichi, Okazaki (JP); Taketo Harada, Obu (JP); Norifumi Matsukawa, Kariya (JP)

(73) Assignee: Denso Corporation, Kariya (JP)

( * ) Notice: Subject to any disclaimer, the term of this patent is extended or adjusted under 35 U.S.C. 154(b) by 727 days.

(21) Appl. No.: 12/556,899

(22) Filed: Sep. 10, 2009

(65) Prior Publication Data
US 2010/0066534 A1      Mar. 18, 2010

(30) Foreign Application Priority Data
Sep. 12, 2008   (JP) .................... 2008-234561

(51) Int. Cl.
*B60Q 1/00* (2006.01)

(52) U.S. Cl. ........ 340/435; 340/436; 340/438; 340/903; 180/167; 180/169; 701/301

(58) Field of Classification Search ............. 340/435, 340/436, 438, 425.5, 903, 933; 701/1, 45, 701/301, 46; 180/167, 169, 170, 171
See application file for complete search history.

(56) References Cited

U.S. PATENT DOCUMENTS

| | | | |
|---|---|---|---|
| 4,732,120 A | | 3/1988 | Naito et al. |
| 5,280,622 A | * | 1/1994 | Tino ............................ 700/255 |
| 5,594,413 A | * | 1/1997 | Cho et al. ....................... 340/435 |
| 6,128,576 A | * | 10/2000 | Nishimoto et al. ........... 701/301 |
| 6,897,768 B2 | * | 5/2005 | Sato et al. ...................... 340/435 |
| 7,719,410 B2 | * | 5/2010 | Labuhn et al. ................ 340/435 |
| 2003/0034883 A1 | | 2/2003 | Sato et al. |
| 2003/0197601 A1 | * | 10/2003 | Takagi et al. ................. 340/435 |

FOREIGN PATENT DOCUMENTS

| | | |
|---|---|---|
| JP | 7-84044 | 3/1995 |
| JP | 2003-270345 | 9/2003 |

* cited by examiner

*Primary Examiner* — Hung T. Nguyen
(74) *Attorney, Agent, or Firm* — Nixon & Vanderhye P.C.

(57) ABSTRACT

An object detecting apparatus includes a sensor, a noise determining portion, a detected result determining portion and a warning portion. The sensor transmits an ultrasonic wave and receives a reflected wave reflected by an object. The noise determining portion determines existence or nonexistence of a noise signal received by the sensor for a plurality of detecting areas by using a different threshold value for each of the plurality of detecting areas. The detected result determining portion validates or invalidates an object detected result of the sensor for each of the detecting areas based on existence or nonexistence of the noise signal determined by the noise determining portion for each of the detecting areas. The warning portion warns about the object detected result for a detecting area that is validated by the detected result determining portion.

6 Claims, 4 Drawing Sheets

| LONG-DISTANCE NOISE DETECTING PERIODE | SHORT-DISTANCE NOISE DETECTING PERIODE | OBJECT DETECTING PERIODE |
|---|---|---|

OBJECT DETECTING APPARATUS

CROSS REFERENCE TO RELATED APPLICATIONS

The present application is based on and claims priority to Japanese Patent Application No. 2008-234561 filed on Sep. 12, 2008, the contents of which are incorporated in their entirety herein by reference.

BACKGROUND OF THE INVENTION

1. Field of the Invention

The present invention relates to an object detecting apparatus that detects an object using an ultrasonic sensor.

2. Description of the Related Art

US 2003/0034883 A (corresponding to JP-A-2003-57340) discloses an object detecting apparatus including an ultrasonic sensor. The ultrasonic sensor transmits an ultrasonic wave having a burst waveform and receives a reflected wave reflected by an object. When a level of the received signal is greater than a threshold value, the object detecting apparatus calculates a distance to the object based on a time from when the ultrasonic wave is transmitted until when the reflected wave is received. When the distance to the object is within a warning distance, the object detecting apparatus outputs a warning.

When the object detecting apparatus detects a noise signal that generates in a surrounding environment as a reflected wave by error, the object detecting apparatus is difficult to detect an object with a high degree of accuracy.

Thus, an object detecting apparatus having a noise resistance is proposed. Before the object detecting apparatus executes an object detection, the object detecting apparatus detects a noise signal received by a sensor and the object detecting apparatus determines existence or nonexistence of the noise signal by comparing a level of the noise signal with a threshold value. When the object detecting apparatus determines that there is no noise signal, the object detecting apparatus validates a detected result of the object detection. When the object detecting apparatus determines that there is a noise signal, the object detecting apparatus invalidates a detected result of the object detection.

In the above-described object apparatus, in order to detect an object at a long distance, it is required to reduce a level of the threshold value for detecting existence or nonexistence of the noise signal because a level of a reflected wave reflected by the object at the long distance is low. However, when the object detecting apparatus determines existence or nonexistence of the noise signal by using a lower threshold value, the object detecting apparatus may determine that there is a noise signal with higher frequency, and thereby an object detection accuracy may be reduced. That is, when the detecting distance is increased, the object detection accuracy may be reduced.

SUMMARY OF THE INVENTION

In view of the foregoing problems, it is an object of the present invention to provide an object detecting apparatus that can have a high object detection accuracy and can detect an object at a long distance.

An object detecting apparatus according to an aspect of the present invention includes a sensor, a noise determining portion, a detected result determining portion, and a warning portion. The sensor is configured to transmit an ultrasonic wave and is configured to receive a reflected wave reflected by an object. The noise determining portion is configured to determine existence or nonexistence of a noise signal received by the sensor for a plurality of detecting areas by using a different threshold value for each of the plurality of detecting areas at a time different from a time from when the sensor transmits the ultrasonic wave until when the sensor receives the reflected wave. Each of the plurality of detecting areas has a different detecting distance. The detected result determining portion is configured to validate or invalidate an object detected result of the sensor for each of the plurality of detecting areas based on existence or nonexistence of the noise signal determined by the noise determining portion for each of the plurality of detecting areas. The warning portion is configured to warn about the object detected result for a detecting area in the plurality of detecting areas that is validated by the detected result determining portion.

The above-described object detecting apparatus can have a high object detection accuracy and can detect an object at a long distance.

An object detecting apparatus according to another aspect of the present invention includes a sensor a detecting portion, an object detectable distance determining portion, and an object detecting portion. The sensor is configured to transmit an ultrasonic wave and is configured to receive a reflected wave reflected by an object. The detecting portion is configured to detect a level of a noise signal received by the sensor at a time different from a time from when the sensor transmits the ultrasonic wave until when the sensor receives the reflected wave. The object detectable distance determining portion is configured to determine an object detectable distance based on the level of the noise signal detected by the detecting portion. The object detecting portion is configured to detect an object within the object detectable distance.

The above-described object detecting apparatus can have a high object detection accuracy and can detect an object at a long distance.

BRIEF DESCRIPTION OF THE DRAWINGS

Additional objects and advantages of the present invention will be more readily apparent from the following detailed description of exemplary embodiments when taken together with the accompanying drawings. In the drawings:

FIG. 3A to FIG. 3C are graphs illustrating relationships between a noise level and threshold values TA and TB;

DETAILED DESCRIPTION OF THE EXEMPLARY EMBODIMENTS

First Embodiment

An object detecting apparatus according to a first embodiment of the present invention will be described with reference to FIG. 1. The object detecting apparatus includes a sensor 10, an ECU 20, a display device 30, and a speaker 40.

The sensor 10 is an ultrasonic sensor. The sensor 10 may be attached, for example, at a front bumper of a vehicle.

The sensor 10 transmits a pulsed ultrasonic wave and receives a reflected wave reflected by an object so as to detect the object. The sensor 10 calculates a distance to the object based on a time from when the sensor 10 transmits the ultrasonic wave until when the sensor 10 receives the reflected wave. The sensor 10 transmits object information to the ECU 20. The object information includes existence or nonexistence of an object and a distance to the object.

The display device 30 includes a display panel, for example, made of liquid crystal. The display device 30 displays image on the display panel in accordance with an image signal from the ECU 20. The speaker 40 outputs voice based on a voice signal from the ECU 20.

The ECU 20 is a computer including a CPU, a memory, an input-output part. The CPU executes various processes based on programs stored in the memory.

The sensor 10 transmits a control signal to the sensor 10 so that the sensor 10 detects an object. The ECU 20 determines existence or nonexistence of an object and a distance to the object. When an object is detected, the ECU 20 warns an occupant using the display device 30 and the speaker 40.

The ECU 20 includes a noise determining circuit 21. The noise determining circuit 21 detects a noise signal received by the sensor 10, and determines existence or nonexistence of the noise signal by comparing a level of the detected noise signal with a threshold value.

The noise determining circuit 21 can change the threshold value and sensitivity based on a control signal from the ECU 20. That is, the noise determining circuit 21 has a plurality of detecting areas each having a different detecting distance and the noise determining circuit 21 sets a different threshold value and a different sensitivity for each of the detecting area so as to determine existence or nonexistence of the noise signal for each of the detecting areas.

In the present embodiment, before the ECU 20 transmits the control signal to the sensor 10 so that the sensor 10 detects an object, the ECU 20 sets a different threshold value and a different sensitivity for each of the two detecting areas having a different detecting distance and determines existence or nonexistence of the noise signal received by the sensor 10 for each of the detecting areas. The ECU 20 validates or invalidates an object detecting result of the sensor 10 based on a noise detected result.

An exemplary process executed by the ECU 20 will be described with reference to FIG. 2. The object detecting apparatus is activated when an ignition switch of the vehicle is turned on. Then, the ECU 20 executes the process illustrated in FIG. 2.

At S100, for a long-distance area, the ECU 20 detects existence or nonexistence of a noise signal received by the sensor 10 by using a first threshold value TA. The ECU 20 sets the threshold value of the noise determining circuit 21 to be the first threshold value TA and the ECU 20 sets the sensitivity of the noise determining circuit 21 to be a high sensitivity. Then, the ECU 20 executes a noise detection for a predetermined period for determining existence or nonexistence of the noise signal for the long-distance area.

At S102, for a short-distance area, the ECU 20 detects existence or nonexistence of a noise signal received by the sensor 10 by using a second threshold value TB greater than the first threshold value TA. The ECU 20 sets the threshold value of the noise determining circuit 21 to be the second threshold value TB and the ECU 20 sets the sensitivity of the noise determining circuit 21 to be a low sensitivity. Then, the ECU 20 executes a noise detection for a predetermined period for determining existence or nonexistence of the noise signal for the short-distance area. When a distance to an object is short, a level of a reflected wave is greater than a case when a distance to the object is long. Thus, for the short-distance area, the second threshold value TB greater than the first threshold value TA is used for determining existence or nonexistence of the noise signal.

At S104, the ECU 20 executes the object detection. The ECU 20 transmits the control signal to the sensor 10 so that the sensor 10 transmits the object information to the ECU 20. The ECU 20 determines existence or nonexistence of an object and a distance to the object based on the object information from the sensor 10.

At S106, the ECU 20 determines existence or nonexistence of the noise signal for the long-distance area based on a detected result at S100.

At S106, the ECU 20 determines existence or nonexistence of the noise signal for the short-distance area based on a detected result at S102.

Figure 3A:
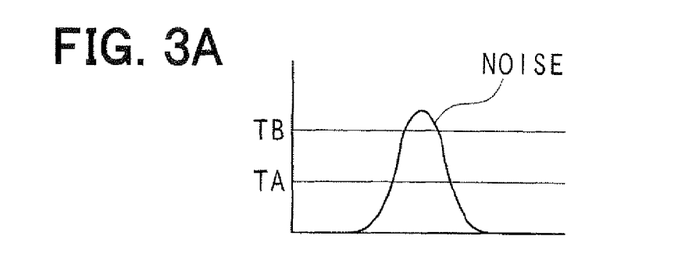
Figure 3B:
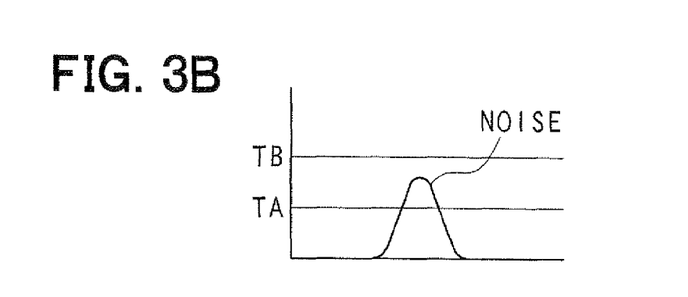
Figure 3C:
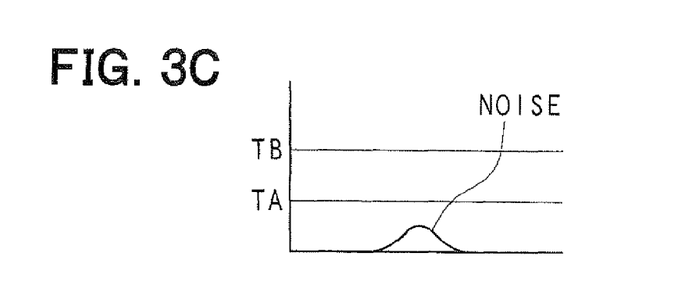

Relationships between a noise level and the threshold values TA and TB are illustrated in FIG. 3A to FIG. 3C. FIG. 3A illustrates a state when the noise level is greater than the threshold values TA and TB. FIG. 3B illustrates a state when the noise level is greater than the first threshold value TA and is less than the second threshold value TB. FIG. 3C illustrates a state when the noise level is less than the first threshold value TA.

When the noise level is less than the first threshold value as illustrated in FIG. 3C, the detected result at S100 is "there is no noise signal" and a determination result at S106 is "NO." Thus, at S110, the ECU 20 validates the object detected result at all distance including the long-distance area and the short-distance area.

When the noise level is greater than the first threshold value TA and is less than the second threshold value TB as illustrated FIG. 3B, the detected result at S100 is "there is a noise signal" and the detected result at S102 is "there is no noise signal." That is, a determination result at S106 is "YES" and a determination result at S108 is "NO." Thus, at S112, the ECU 20 validates the object detected result at a short distance. That is, the ECU 20 invalidates the object detected result for the long-distance area and validates the object detected result for the short-distance area. The ECU 20 validates the detected object and the detected distance to the object only when the detected distance to the object is within the short-distance area.

When the noise level is greater than the second threshold value TB as illustrated FIG. 3A, the detected result at S100 is "there is a noise signal" and the detected result at S102 is "there is a noise signal." That is, a determination result at S06 is "YES" and a determination result at S108 is "YES." Thus, at S112, the ECU 20 invalidates the object detected result at all distance. That is, the ECU 20 invalidates the object detected result for both of the long-distance area and the short-distance area.

At S116, the ECU 20 determines whether a warning is required. In the present embodiment, in order to restrict an error detection, the ECU 20 determines that a warning is required when the number of times (NV) the ECU 20 successively validates the object detected result is greater than or equal to a reference number of times (NR), for example, three times. In addition, when the number of times the ECU 20 successively invalidates the object detected result is greater than or equal to the reference number of times, the ECU 20 determines that the warning is not required.

Thus, until the number of times (NV) the ECU 20 successively validates the object detected result becomes greater than or equal to the reference number of times (NR), a determination result at S116 becomes "NO" and the process returns to S100 without a warning.

When the number of times (NV) the ECU 20 successively validates the object detected result is greater than or equal to the reference number of times (NR), the determination result at S116 becomes "YES" and the process proceeds to S120. At S120, the ECU 20 executes a waning about the object detected result for a detecting area that is validated at S110, S112, and S114. The ECU 20 transmits a control signal to the display device 30 and the speaker 40, and thereby the display device 30 displays a message indicating that an object is detected and information indicating a distance to the object on the display panel and the speaker 40 outputs a message indicating that the object is detected.

When the number of times the ECU 20 successively invalidates the object detected result is greater than or equal to the reference number of times, the determination result at S116 becomes "NO" and the process returns to S100 without a warning.

Figure 4:
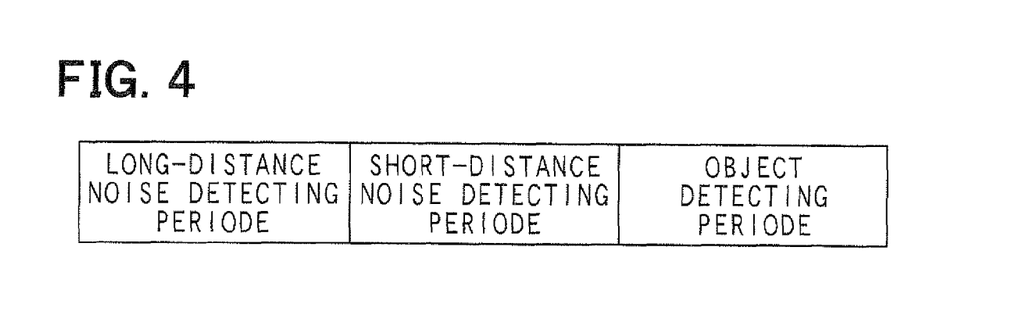
FIG. 4 is a timing diagram illustrating noise detecting periods and an object detecting period according to the first embodiment.

FIG. 4 illustrates a timing diagram indicating a noise detecting period for the long-distance area, a noise detecting period for the short distance area, and a detecting period of an object. In the present embodiment, firstly, the ECU 20 sets the threshold value of the noise determining circuit 21 to be the first threshold value TA and the ECU 20 sets the sensitivity of the noise determining circuit 21 to be the high sensitivity. Then, the ECU 20 executes the noise detection for the predetermined period for determining existence or nonexistence of the noise signal for the long-distance area. After that, the ECU 20 changes the threshold value of the noise determining circuit 21 to be the second threshold value TB and the ECU 20 changes the sensitivity of the noise determining circuit 21 to be the low sensitivity. Then, the ECU 20 executes the noise detection for the predetermined period for determining existence or nonexistence of the noise signal for the short distance area. Thus, the ECU 20 can executes the noise detection for a plurality of detecting areas each having a different detecting distance using one noise determining circuit 21

In the object detecting apparatus according to the present embodiment, the ECU 20 determines existence or nonexistence of the noise signal received by the sensor 10 using the different threshold value for each of the detecting areas. The ECU 20 validates or invalidates the object detecting result for each of the detecting areas based on the noise detected result for each of the detecting areas. Then, the ECU 20 warns about the object detected result for the detecting area that is validated. Therefore, the object detecting apparatus can have a high object detection accuracy and can detect an object at a long distance.

In addition, the ECU 20 sets the threshold value of the noise determining circuit 21 to be the first threshold value TA and determines existence or nonexistence of the noise signal for the long-distance area, and the ECU 20 sets the threshold value of the noise determining circuit 21 to be the second threshold value TB different from the first threshold value TA and determines existence or nonexistence of the noise signal for the short-distance area. Thus, the ECU 20 can determine existence or nonexistence of the noise signal for each of the detecting areas using one noise determining circuit 21, and a plurality of noise determining circuits is not required.

Furthermore, the second threshold value TB used for the noise detection for the short-distance area is greater than the first threshold value TA used for the noise detection for the long-distance area. When the ECU 20 determines that there is no noise signal for the long-distance area, the ECU 20 can validate the object detecting result for the long-distance area and the short-distance area. When the ECU 20 determines that there is a noise signal for the long-distance area and there is no noise signal for short-distance area, the ECU 20 can validate the object detecting result for the short-distance area.

When the ECU 20 executes the noise detection for the long-distance area, the ECU 20 sets the sensitivity of the noise determining circuit 21 to be the high sensitivity and when the ECU 20 executes the noise detection for the short-distance area, the ECU 20 sets the sensitivity of the noise determining circuit 21 to be the low sensitivity. Thus, the ECU 20 can determine existence or nonexistence of the noise signal with a high degree of accuracy.

Second Embodiment

Figure 5:
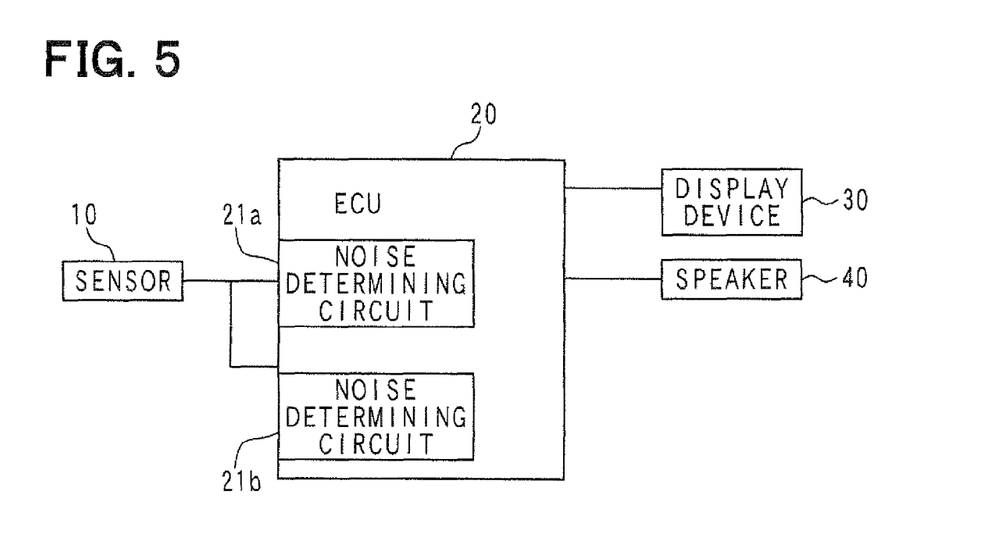
FIG. 5 is a block diagram illustrating an object detecting apparatus according to a first embodiment of the present invention.

An object detecting apparatus according to a second embodiment of the present invention will be described with reference to FIG. 5.

An ECU 20 according to the present embodiment includes a first noise determining circuit 21*a* and a second noise determining circuit 21*b*. The first noise determining circuit 21*a* determines existence or nonexistence of a noise signal for the long-distance area and the second noise determining circuit 21*b* determines existence or nonexistence of a noise signal for the short-distance area.

The ECU 20 sets a threshold value of the first noise determining circuit 21*a* to be the first threshold value TA and the ECU 20 sets a sensitivity of the first noise determining circuit 21*a* to be a high sensitivity. In addition, the ECU 20 sets a threshold value of the second noise determining circuit 21*b* to be the second threshold value TB and the ECU 20 sets a sensitivity of the second noise determining circuit 21*b* to be the a low sensitivity.

Figure 2:
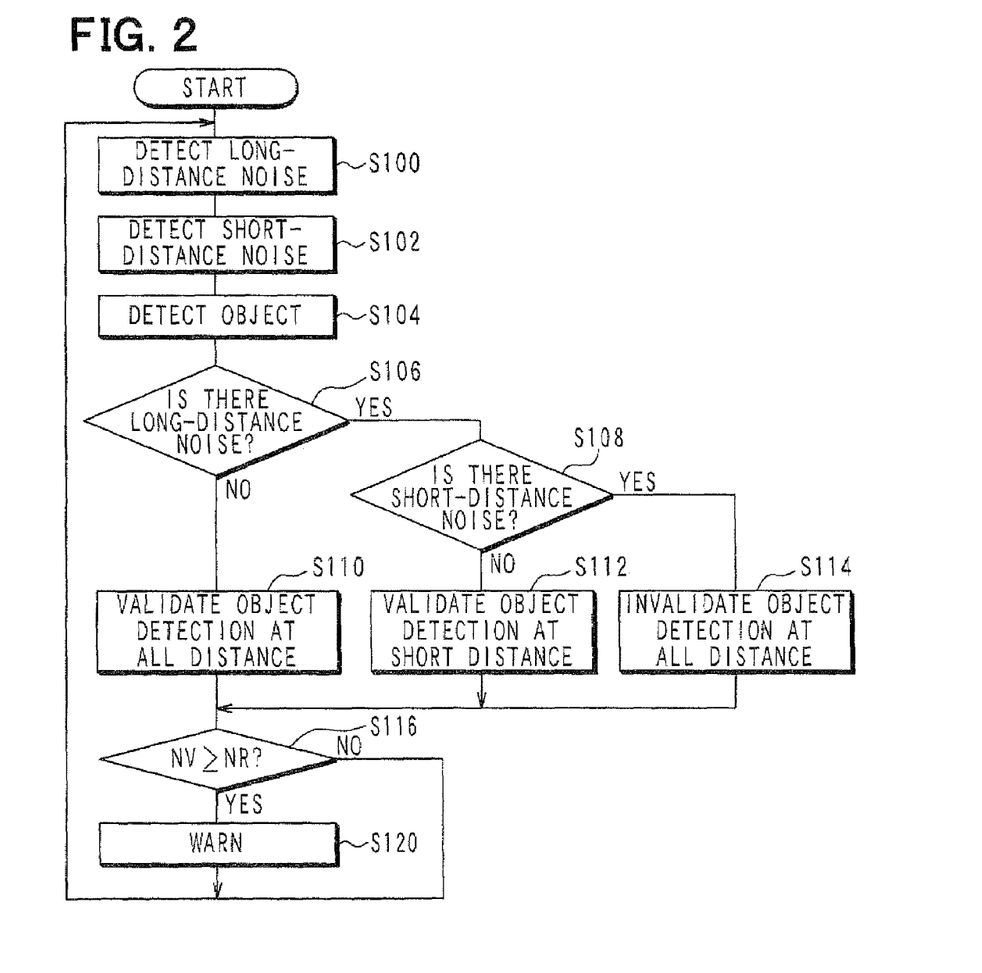
FIG. 2 is a flowchart illustrating an exemplary process performed by an ECU in the object detecting apparatus according to the first embodiment.

The ECU 20 according to the present embodiment executes a process similar to the process illustrated in FIG. 2. In the present embodiment, the ECU 20 is not required to change the threshold value and the sensitivity for each of the long-distance area and the short-distance area, and the ECU 20 can execute a noise detection for the long-distance area and a noise detection for the short-distance area at substantially the same time using the first noise determining circuit 21*a* and the second noise determining circuit 21*b*. That is, in the present embodiment, the ECU 20 executes the process at S100 and the process at S102 at substantially the same time.

Figure 6:
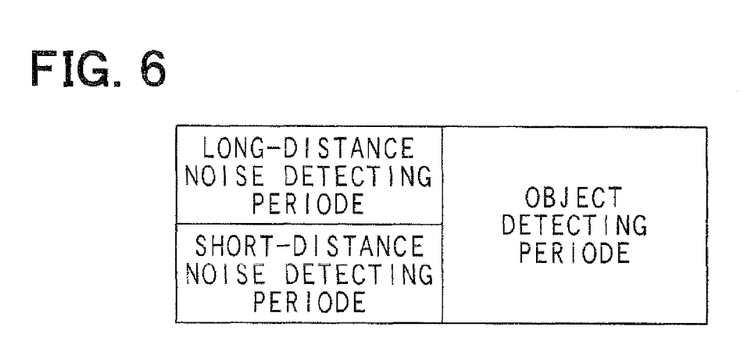
FIG. 6 is a timing diagram illustrating noise detecting periods and an object detecting period according to the second embodiment.

Because the ECU 20 can execute the noise detection for the long-distance area and the noise detection for the short-distance area at substantially the same time as illustrated in FIG. 6, a noise detecting period can be reduced compared with the ECU 20 according to the first embodiment.

The ECU 20 determines existence or nonexistence of the noise signal for the long-distance area based on the determination result of the first noise determining circuit 21*a* and the ECU 20 determines existence or nonexistence of the noise signal for the short-distance area based on the determination result of the second noise determining circuit 21*b*. Thus, the ECU 20 can detect a noise signal received by the sensor 10 using the first determining circuit 21*a* and the second noise determining circuit 21b at substantially the same time, and thereby the noise detecting period can be reduced compared with a case where the ECU 20 uses one noise determining circuit.

The second noise determining circuit 21b determines existence or nonexistence of the noise signal for the short-distance area by comparing a level of detected noise signal with the second threshold value TB greater than the first threshold value TA. When the ECU 20 determines that there is no noise signal for the long-distance area, the ECU 20 can validate the object detecting result for the long-distance area and the short-distance area. When the ECU 20 determines that there is a noise signal for the long-distance area and there is no noise signal for short-distance area, the ECU 20 can validate the object detecting result for the short-distance area.

Third Embodiment

An object detecting apparatus according to a third embodiment of the present invention will be described below. The object detecting apparatus according to the present embodiment detects a level of the noise signal received by the sensor 10, determines an object detectable distance based on the level of the noise signal, and detects an object within the object detectable distance.

Figure 1:
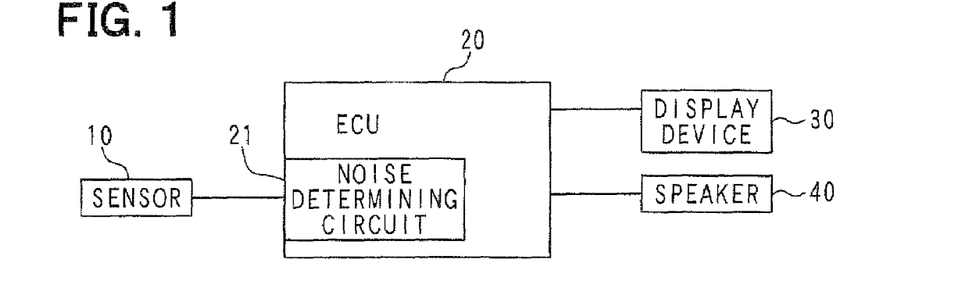
FIG. 1 is a block diagram illustrating an object detecting apparatus according to a first embodiment of the present invention.

A configuration of the object detecting apparatus is similar to the object detecting apparatus illustrated in FIG. 1. A noise determining circuit 21 according to the present embodiment detects a level of a noise signal received by the sensor 10 and transmits a signal indicating the level of the noise signal to an ECU 20.

Figure 7:
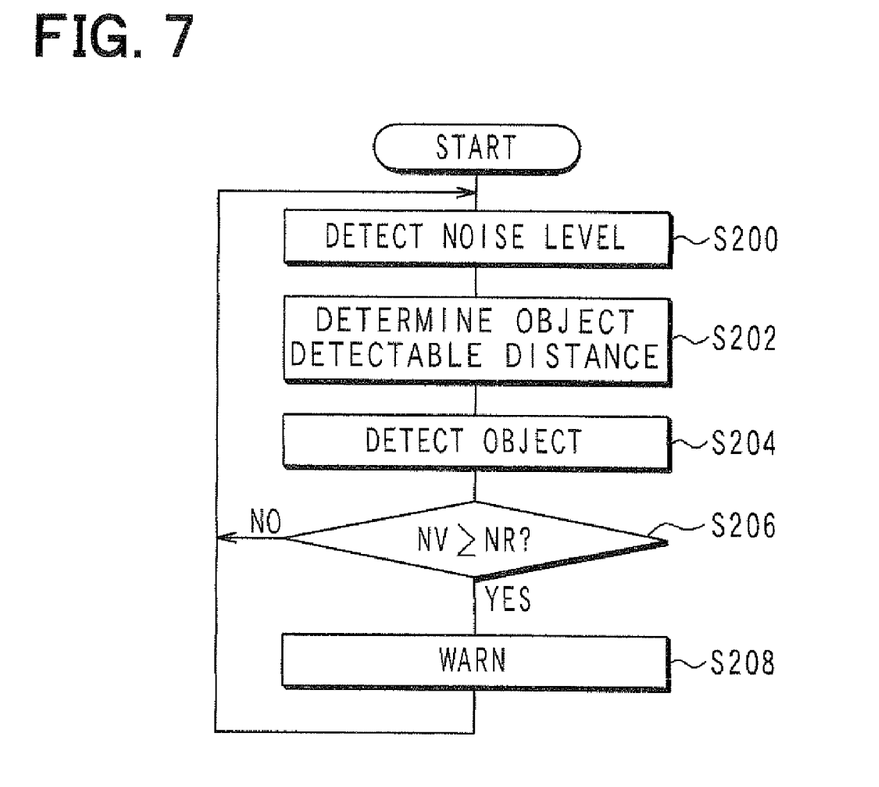
FIG. 7 is a flowchart illustrating an exemplary process performed by an ECU in an object detecting apparatus according to a third embodiment of the present invention.

An exemplary process performed by the ECU 20 according to the present embodiment will be described with reference to FIG. 7. The object detecting apparatus is activated when an ignition switch of the vehicle is turned on. Then the ECU 20 executes the process illustrated in FIG. 7.

At S200, the ECU 20 detects a noise level based on the signal indicating the noise level transmitted from the noise determining circuit 21.

Figure 8:
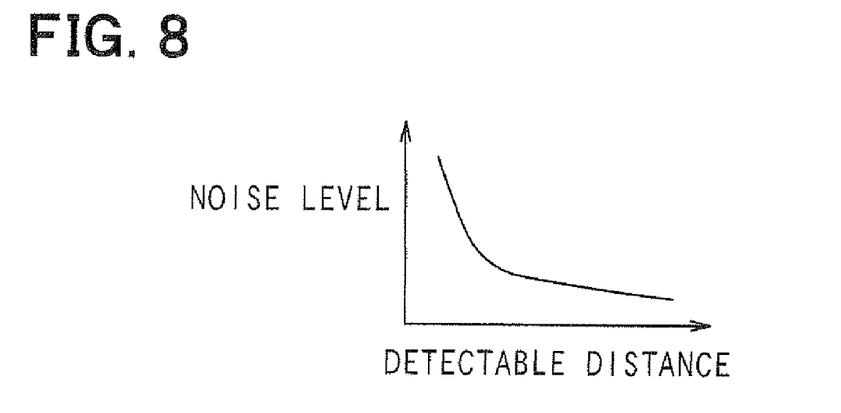
FIG. 8 is a graph illustrating a relationship between an object detectable distance and a noise level.

At S202, the ECU 20 determines the object detectable distance within which the object detecting apparatus can stably detect an object. The ECU 20 has a memory and information indicating a relationship between the object detectable distance and the noise level as illustrated in FIG. 8 is stored in the memory. The ECU 20 determines the object detectable distance corresponding to the detected noise level based on the information stored in the memory. When the noise level is low, the object detecting apparatus can stably detect an object at a long distance. However, when the noise level is high, the object detecting apparatus is difficult to detect an object at a long distance. Thus, in the relationship between object detectable distance and the noise level, when the noise level is low, the object detectable distance becomes long, as illustrated in FIG. 8.

At S204, the ECU 20 executes an object detection. In the present embodiment, the ECU 20 detects an object within the object detectable distance. The ECU 20 transmits a control signal to the sensor 10 so that the sensor 10 detects an object. The sensor 10 transmits object information to the ECU 20 in response to the control signal. The ECU 20 determines existence or nonexistence of an object and a distance to the object based on the object information. When the distance to the object is within the object detectable distance the ECU 20 validates an object detected result. When the distance to the object is longer than the object detectable distance, the ECU 20 invalidates an object detected result.

At S206, the ECU 20 determines whether a warning is required. In the present embodiment, in order to restrict an error detection, the ECU 20 determines that a warning is required when the number of times (NV) the ECU 20 successively validates the object detected result is greater than or equal to a reference number of times (NR), for example. When the number of times the ECU 20 successively invalidates the object detected result is greater than or equal to the reference number of times, the ECU 20 determines that a warning is not required.

Thus, until the number of times (NV) the ECU 20 successively validates the object detected result becomes greater than or equal to the reference number of times (NR), a determination result at S206 becomes "NO" and the process returns to S200 without a warning.

When the number of times the ECU 20 successively determines that the distance to the object is within the object detectable distance is greater than or equal to the reference number of times and when the number of times the ECU 20 successively validates the object detected result is greater than or equal to the reference number of times, a determination result at S206 becomes "YES" and the process proceeds to S208. At S208, the ECU 20 executes a warning. The ECU 20 transmits a control signal to the display device 30 and the speaker 40, and thereby the display device 30 displays a message indicating that an object is detected and information indicating the distance to the object on the display panel and the speaker 40 outputs a message indicating that the object is detected.

When the number of times the ECU 20 successively invalidates the object detected result is greater than or equal to the reference number of times, the determination result at S206 becomes "NO" and the process returns to S200 without a warning.

The object detecting apparatus according to the present embodiment detects the level of the noise signal received by the sensor 10, determines the object detectable distance based on the level of the noise signal, and detects an object within the object detectable distance. Therefore, the object detecting apparatus can have a high object detection accuracy and can detect an object at a long distance.

The ECU 20 can set the object detectable distance in such a manner that when the detected noise level is low, the object detectable distance becomes long.

In the above-described example, the information indicating the relationship between the object detectable range and the noise level is stored in the memory and the ECU 20 determines the object detectable range corresponding to the detected noise level based on the information. Alternatively, the ECU 20 may determine the object detectable distance using a function for calculating the object detectable distance from the detected noise level.

In the above-described example, the ECU 20 sets the object detectable distance in such a manner that the when the noise level is low the object detectable distance becomes long. Alternatively, the ECU 20 may set a first object detectable distance when the noise level is greater than or equal to a predetermined level, and ECU 20 may set a second object detectable distance longer than the first object detectable distance when the noise level is less than the predetermined level.

Other Embodiments

Although the present invention has been fully described in connection with the exemplary embodiments thereof with reference to the accompanying drawings, it is to be noted that various changes and modifications will become apparent to those skilled in the art.

In each of the above-described first and second embodiments, the ECU 20 determines existence or nonexistence of a noise signal received by the sensor 10 before executing the object detection. Alternatively, the ECU 20 may determine existence or nonexistence of a noise signal received by the sensor 10 after executing the object detection.

In the above-described third embodiment, the ECU 20 detects a level of a noise signal received by the sensor 10 and determines the object detectable distance based on the detected noise level before executing the object detection. Alternatively, the ECU 20 may detect the level of the noise signal received by the sensor 10 and may determine the object detectable distance based on the detected noise level after executing the object detection.

In each of the above-described first to third embodiments, the object detecting apparatus detects an object using one sensor 10. Alternatively, the object detecting apparatus may detect an object using a plurality of sensors 10. In such a case, the sensors 10 may be attached to a right side and a left side of a front bumper of a vehicle and the sensors 10 may be attached to a right side and a left side of a rear bumper of a vehicle.

In each of the above-described first and second embodiment, the ECU 20 sets a different sensitivity in accordance with the detecting distance. Alternatively, the sensitivity for detecting a noise signal may be fixed regardless of the detecting distance.

In the above-described embodiments the ECU 20 can function as a noise determining potion during the process at S100, S102, S106, and S108. The ECU 20 can function as a detected result determining portion during the process at S110, S112, and S114. The ECU 20 can function as a warning portion at the process at S120. The first noise determining circuit 21a can function as a first noise determining circuit, and the second noise determining circuit 21b can function as a second noise determining circuit. The ECU 20 can function as a first noise determining portion during the process at S100 and S106, and the ECU 20 can function as a second noise determining portion during the process at S102 and S108. The ECU 20 can function as a detecting portion at S200, the ECU 20 can function as an object detectable distance determining portion during the process at S202, and the ECU 20 can function as a object detecting portion during the process at S204.

What is claimed is:

1. An object detecting apparatus comprising:
a sensor configured to transmit an ultrasonic wave and configured to receive a reflected wave reflected by an object;
a noise determining portion configured to determine existence or nonexistence of a noise signal received by the sensor for a plurality of detecting areas by using a different threshold value for each of the plurality of detecting areas at a time different from a time from when the sensor transmits the ultrasonic wave until when the sensor receives the reflected wave, each of the plurality of detecting areas having a different detecting distance;
a detected result determining portion configured to validate or invalidate an object detected result of the sensor for each of the plurality of detecting areas based on existence or nonexistence of the noise signal determined by the noise determining portion for each of the plurality of detecting areas; and
a warning portion configured to warn about the object detected result for a detecting area in the plurality of detecting areas that is validated by the detected result determining portion;
wherein the noise determining portion includes:
a noise determining circuit configured to detect the noise signal received by the sensor and configured to determine existence or nonexistence of the noise signal by comparing a level of the detected noise signal with the threshold value;
a first noise determining portion configured to set the threshold value of the noise determining circuit to be a first threshold value and configured to determine existence or nonexistence of the noise signal for a first detecting area in the plurality of detecting areas; and
a second noise determining portion configured to set the threshold value of the noise determining circuit to be a second threshold value different from the first threshold value and configured to determine existence or nonexistence of the noise signal for a second detecting area in the plurality of detecting areas.

2. The object detecting apparatus according to claim 1, wherein:
the second detecting area has a detecting distance shorter than the first detecting area;
the second threshold value is greater than the first threshold value;
the detected result determining portion validates the object detected result for the first detecting area and the object detected result for the second detecting area when the first noise determining portion determines that there is no noise signal; and
the detected result determining portion validates the object detected result for the second detecting area when the first noise determining portion determines that there is a noise signal and the second noise determining portion determines that there is no noise signal.

3. The object detecting apparatus according to claim 2, wherein:
the noise determining circuit detects the level of the noise signal with a sensitivity set by the first noise determining portion and the second noise determining portion;
the first noise determining portion sets the sensitivity of the noise determining circuit to be a first sensitivity and determines the level of the noise signal; and
the second noise determining portion sets the sensitivity of the noise determining circuit to be a second sensitivity lower than the first sensitivity and determines the level of the noise signal.

4. An object detecting apparatus comprising:
a sensor configured to transmit an ultrasonic wave and configured to receive a reflected wave reflected by an object;
a noise determining portion configured to determine existence or nonexistence of a noise signal received by the sensor for a plurality of detecting areas by using a different threshold value for each of the plurality of detecting areas at a time different from a time from when the sensor transmits the ultrasonic wave until when the sensor receives the reflected wave, each of the plurality of detecting areas having a different detecting distance;
a detected result determining portion configured to validate or invalidate an object detected result of the sensor for each of the plurality of detecting areas based on existence or nonexistence of the noise signal determined by the noise determining portion for each of the plurality of detecting areas; and a warning portion configured to warn about the object detected result for a detecting area in the plurality of detecting areas that is validated by the detected result determining portion;

wherein the noise determining portion includes:

a first noise determining circuit configured to detect the noise signal received by the sensor and configured to determine existence or nonexistence of the noise signal for a first detecting area in the plurality of detecting areas by comparing a level of the noise signal with a first threshold value;

a second noise determining circuit configured to detect the noise signal received by the sensor and configured to determine existence or nonexistence of the noise signal for a second detecting area in the plurality of detecting areas by comparing a level of the noise signal with a second threshold value different from the first threshold value;

a first noise determining portion configured to determine existence or nonexistence of the noise signal for the first detecting area based on a determination result of the first noise determining circuit; and a second noise determining portion configured to determine existence or nonexistence of the noise signal for the second detecting area based on a determination result of the second noise determining circuit.

5. The object detecting apparatus according to claim 4, wherein:

the second detecting area has a detecting distance shorter than the first detecting area;

the second threshold value is greater than the first threshold value;

the detected result determining portion validates the object detected result for the first detecting area and the object detected result for the second detecting area when the first noise determining portion determines that there is no noise signal; and the detected result determining portion validates the object detected result for the second detecting area when the first noise determining portion determines that there is a noise signal and the second noise determining portion determines that there is no noise signal.

6. The object detecting apparatus according to claim 5, wherein:

the first noise determining circuit detects the level of the noise signal with a sensitivity set by the first noise determining portion;

the second noise determining circuit detects the level of the noise signal with a sensitivity set by the second noise determining portion;

the first noise determining portion sets the sensitivity of the first noise determining circuit to be a first sensitivity and determines the level of the noise signal; and the second noise determining portion sets the sensitivity of the second noise determining circuit to be a second sensitivity lower than the first sensitivity and determines the level of the noise signal.

* * * * *